Nov. 8, 1960     A. F. ERWIN     2,959,133
HERMETICALLY SEALED PUMP MOTOR UNIT
Filed Sept. 23, 1957

Inventor
Arthur F. Erwin
by Robert B. Benson
Attorney 2,959,133
Patented Nov. 8, 1960

2,959,133
HERMETICALLY SEALED PUMP MOTOR UNIT

Arthur F. Erwin, Oconomowoc, Wis., assignor to Allis-Chalmers Manufacturing Company, Milwaukee, Wis.

Filed Sept. 23, 1957, Ser. No. 685,659

1 Claim. (Cl. 103—87)

This invention relates to centrifugal pumps. More specifically, this invention relates to improvements in centrifugal pump motor units, particularly to hermetically sealed units for pumping hot liquids and means for maintaining the motor at relatively cool operating temperatures.

In the past many pumps have been developed to pump hot liquids. Many prior art motor pump units incorporate a liquid cooling system, generally water, which surrounds the pump shaft and is positioned between the motor and the pump to cool the shaft. By cooling the shaft, the heat transfer between the pump and the motor is reduced, thereby allowing the motor to operate at a cooler temperature.

Another means to maintain the motor at a relatively low opertaing temperature is to circulate air directly around the shaft between the motor and the pump. The circulating air will absorb some of the heat conducted upward in the shaft, cooling the shaft, which results in lower motor temperatures.

The physical characteristics of liquid sodium creates a unique problem when it is being pumped. At elevated operating temperatures, at which liquid sodium is usually pumped, the sodium reacts explosively with water. At similar temperatures, liquid sodium is easily contaminated reacting readily with the atmosphere unless the atmosphere is inert. To avoid these problems when pumping liquid sodium, it is desirable to utilize a pump motor unit which eliminates the coolant leakage hazard by using cooling means other than water, and prevents reaction between the liquid sodium and the contained atmosphere by keeping an inert gas atmosphere in the pumping system.

Therefore, it is an object of this invention to provide a new and improved pump motor unit for pumping hot liquids.

Another object of this invention is to provide a new and improved pump motor unit which retards heat transfer along the pump motor shaft to allow the motor to operate at a lower operating temperature.

Another object of this invention is to provide a pump motor unit for pumping hot liquids which is hermetically sealed.

Objects and advantages other than those now set forth will be apparent from the following description when read in connection with the following drawings in which.

Figure 1:
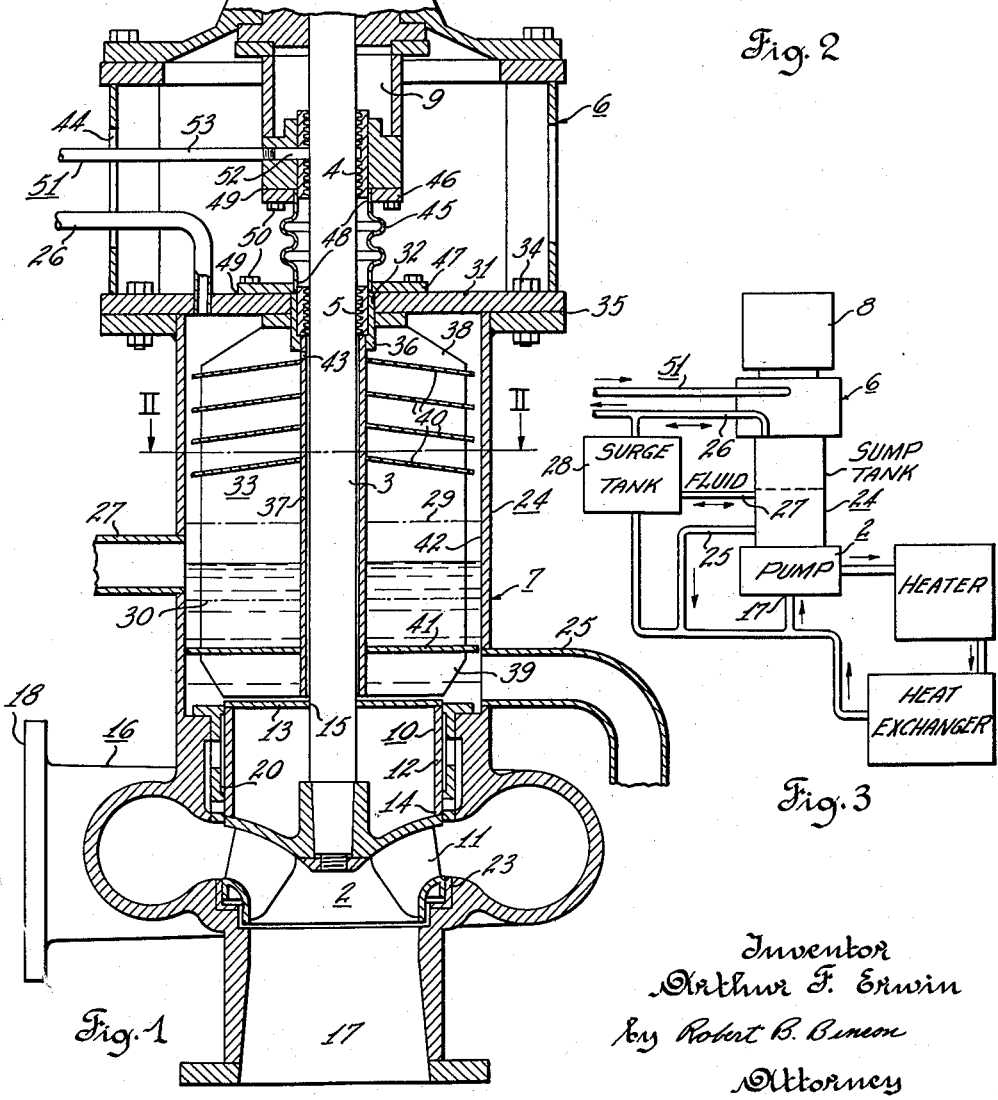
Fig. 1 is a sectional view of a hermetically sealed pump motor unit of this invention.
Figure 2:
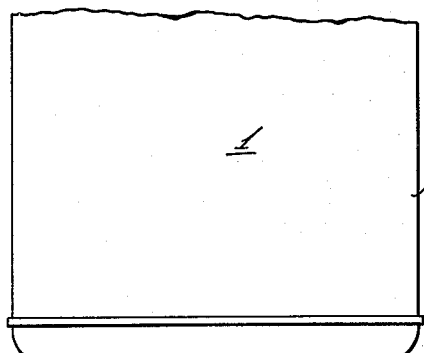
Fig. 2 is a cross section taken along the line II—II of Fig. 1.

The heremetically sealed pump motor unit of this invention is illustrated in Fig. 1 and comprises an electric motor 1, a pump 2, a shaft 3 connecting the motor 1 to the pump 2, upper 4 and lower 5 labyrinth type seals, and upper 6 and lower 7 motor support cylinders for mounting the unit and maintaining a proper axial distance between the motor 1 and the pump 2.

The electric motor 1 is vertically mounted on the upper support cylinder 6 and totally enclosed in a hermetic housing 8 except for an aperture 9 in the lower portion of the housing 8. The elongated shaft 3 extends through the aperture and downward from the housing 8 and is driven by the motor 1 in any suitable way. The motor 1 is provided with suitable sealed wire leads extending through the housing 8 for connecting the motor 1 to a suitable source of power.

The pump 2 has an impeller assembly 10 mounted at the lower end of the elongated shaft 3 for rotation with the shaft. The impeller assembly 10 comprises an impeller 11, a bearing cylinder 12, and a bearing cylinder covering plate 13. The bearing cylinder 12 surrounds the shaft 3 having one end 14 rigidly attached to the periphery of the impeller 11, and extends upward from the periphery of the impeller 11. The cover plate 13 is removably mounted on the bearing cylinder 12 and defines a centrally located aperture 15 for receiving the shaft 3.

A pump casing 16 surrounds the impeller assembly 10 and defines an inlet 17 and an outlet 18. The impeller assembly 10 is poistioned in the pump casing 16 having the inlet 17 of the pump 2 aligned with the eye of the impeller 11, and the pump outlet 18 aligned with the discharge periphery of the impeller 11.

Means are provided in the casing 16 for maintaining the rotating impeller assembly 10 centralized relative to the pump casing such as by bolts. Preferably as shown in Fig. 1, a hydrostatic bearing 20 is mounted within the upper portion of the casing 16 in any suitable way and positioned to rotatably receive the bearing cylinder 12 of the impeller assembly 10. Means are provided in the casing adjacent the hydrostatic bearing to admit a predetermined amount of high pressure fluid from the discharge of the pump to the hydrostatic bearing to lubricate the mating service of the bearing cylinder and the bearing. A hydrostatic bearing is preferred because of its substantially frictionless operation and its ability to operate at high temperatures such as those encountered when pumping liquid metals.

A casing ring 23 is mounted in the lower portion of the casing 16 surrounding the inlet 17 and adjacent to the impeller 11 to receive the impeller wearing surface.

The lower motor support 7 surrounds the shaft 3 and is hermetically mounted on the casing 16 to form a sump tank 24.

Figure 3:
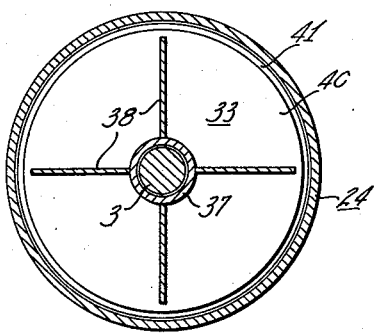
Fig. 3 is a flow chart of a hermetically sealed system embodying the motor pump unit of this invention.

As shown in Fig. 3, conduit 25 extends between the sump tank 24 and the inlet 17, and is positioned immediately above the impeller assembly 10 to maintain fluid pressure balance between the sump tank 24 and the pump inlet 17.

Also shown in Fig. 3, conduits 26, 27 extend between the sump tank 24 and etxernal means, such as a surge tank 28 to maintain the liquid in the sump tank 24 between predetermined levels 29, 30. The conduit 27 is connected to the sump tank 24 intermediate of the predetermined levels 29 and 30. The conduit 26 positioned above the liquid level in the sump tank 24 equalizes pressure between the sump tank 24 and the external means. This allows the liquid to flow freely between the sump tank 24 and the external means thereby correlating the liquid levels.

The cover 31 is mounted on the sump tank 24 and defines a centrally located aperture 32 to receive the shaft 3. As shown in Fig. 1, the cover 31 is removably mounted on the tank by bolts 34, and suitable gasket 35 is placed between the cover 31 and the sump tank 24, for heremetically sealing the cover 31 to the tank 24. This cover 31 also provides a support for a baffle assembly 33 extending into the sump tank 24, and for the lower labyrinth type seal 5.

The baffle assembly 33 is provided in the sump tank 24 to prevent whirling and displacement of the liquid in the tank, to retard spray formation in the tank to retard liquid level surges in the tank due to transient pressure changes, and to retard radiation and convection heat transfer from the hot liquid to the upper elements of the assembly and sump tank. The baffle assembly 33 comprises a supporting member 36, a vertical tube 37, upper 38 and lower 39 vertical baffles, and upper 40 and lower 41 horizontal baffles.

Means are provided for mounting the vertical tube 37 of the baffle assembly 33 on the support member 36. As shown in Fig. 1, the vertical tube 37 surrounds the shaft 3 and extends from the supporting member 36 downward ending immediately above the impeller assembly 10.

The lower horizontal baffle 41 is rigidly attached to the tube 37 at a position immediately above the balancing conduit 25, and extends radially outward to a position adjacent to the inner walls 42 of the sump tank 24. The lower vertical baffles 39 arcuately spread, are attached to the tube 37 and the underside of the lower horizontal baffle 41. These baffles 39 extend downward from the lower horizontal baffle 41 and to the end of the tube 37 and outward from the tube 37 to a position adjacent to the sump tank wall 42.

The upper vertical baffles 38 are in alignment with the lower vertical baffles 39, and extend from above the lower horizontal baffle 41 to the baffle assembly supporting member 36. These baffles are attached to the tube 37, the upper side of the lower horizontal baffle 41, and to the supporting member 36. As shown in Fig. 1, the upper vertical baffles 38 extend outward the same distance as the lower vertical baffles 39.

A series of generally horizontal baffles 40 are positioned in the tank above the liquid being pumped. The horizontal baffles 40 are attached to the tube 37 and the upper vertical baffles 38, and slope slightly downward to a position between the end of the vertical baffles 38 and the sump tank wall 42.

As shown in Fig. 1, a breather hole 43 is provided in the vertical tube 37 of the baffle assembly 33 to equalize the pressure inside the tube and the sump tank 24. As shown the breather hole 43 is positioned immediately below the supporting member 36 of the baffle assembly 33.

As shown in Fig. 1, the upper motor support cylinder 6 surrounds the shaft 3 and is provided with openings 44 circumferentially spaced to allow passage of air through the cylinder for cooling the shaft 3. Means are provided for mounting the motor housing 8 on the cylinder 6 and for mounting the cylinder 6 on the sump tank cover 31.

A bellows type expansion cylinder 45 surrounds the shaft 3 and provides hermetic means for connecting the motor housing 8 to the sump tank cover 31. As shown in Fig. 1, the bellows type cylinder 45 has mounting flanges 46 and 47 rigidly attached to its upper and lower ends respectively. The mounting flanges 46 and 47 define apertures 48 to receive the shaft 3. The lower mounting flange 47 is hermetically mounted on the sump tank cover 31 and the upper mounting flange 46 is hermetically mounted to the motor housing 8. The mounting flanges provide hermetic sealing when assembled with suitable gaskets 49 and bolts 50.

Means to introduce inert gas in the pump motor unit is provided by inlet duct 51 connecting the upper labyrinth 4 to an external inert gas source. Preferably as shown in Fig. 1, the inlet duct 51, connecting the labyrinth 4 with an external source of inert gas comprises a passageway 52 through the motor housing and a pipe 53 threadedly engaging the passageway. The lower labyrinth type seal 5 is mounted by suitable means on the support member 36 and surrounds the shaft 3 in the sump tank 24. The seal 5 is provided to condense but not solidify any upward vapor diffusion, if any. As shown in Fig. 1, the labyrinth type seal is so positioned in the sump tank 24 that the temperature of the labyrinth seal 5 is below the condensation temperature of the liquid being pumped but above the solidification temperature of the liquid.

In operation as the liquid is being pumped, the liquid is maintained between predetermined levels in the sump tank by conduits 26 and 27. The rotating shaft 3 and the impeller assembly 10, being immersed in the liquid being pumped, tend to whirl the liquid in the sump tank 24. The vertical baffles 38 and 39 that are attached to the tube 37 and immersed in the liquid being pumped, prevent whirling of the liquid in the sump tank 24 and correspondingly prevent centrifugal displacement, vortices and oscillations of the liquid. A small amount of high pressure liquid tends to jet into the sump tank 24 from the hydrostatic bearing 20 through the clearance between the bearing 20 and the bearing cylinder 12. The lower horizontal baffle 41 prevents this liquid from jetting into or above the main body of liquid in the sump tank 24, as well as retarding any sudden pressure surges of the system. Heat radiation and convection upward from the hot liquid in the sump tank 24 is retarded and partially dissipated by the upper horizontal baffles 40. Heat in the shaft 3 conducted above the sump tank 24, is further dissipated by passage of air over the external surfaces of the bellows type expansion cylinder 45.

Inert gas at a positive pressure is admitted to the unit through the duct 51, leading to the upper labyrinth 4. The labyrinth type seals 4 and 5 allow the inert gas to diffuse downward very slowly, enabling it to overcome upward vapor diffusion through the labyrinths 4 and 5, if any. Any excessive gas vapor mixture in the sump tank 24 is discharged through a duct 26 in the sump tank cover 31 to external collecting means for disposal or purification and recirculation.

Although but one embodiment has been illustrated and described, it will be apparent to those skilled in the art that various changes and modifications may be made therein with out departing from the spirit of the invention or from the scope of the appended claim.

What is claimed is:

A hermetically sealed pump motor unit for pumping hot liquids comprising: a vertically mounted electric motor having a hermetic housing; an elongated shaft extending downward from the lower end of said motor housing and driven by said motor; an impeller assembly mounted on the lower end of said shaft, a bearing cylinder, and a bearing cylinder cover plate, said bearing cylinder surrounding said shaft and having one end rigidly attached to the periphery of the impeller, said cover plate removably mounted on the other end of said bearing cylinder and defining a centrally located aperture for receiving said shaft; a casing enclosing said impeller assembly and defining a pumping chamber having an inlet and outlet; a lower motor support cylinder surrounding said shaft and mounted on said casing to form a sump tank; external means for maintaining the liquid being pumped between predetermined levels in said sump tank; a liquid pressure balancing conduit extending between said sump tank and said inlet; a hermetic cover for said sump tank having a centrally located aperture for receiving said shaft; baffle means positioned in said sump tank, said baffle means comprising a support member, a vertical tube having its upper end connected to said support member, upper and lower arcuately spaced vertical baffles, and upper and lower horizontal vertically spaced baffles; a labyrinth type seal surrounding said shaft adjacent said sump tank cover and positioned above the liquid to maintain a temperature in said seal to condense but not solidify any upward diffusion of vapor; an inert gas system comprising an upper labyrinth type seal surrounding said shaft and positioned adjacent said motor housing to seal said shaft to said housing; an intake duce connecting said seal to a bellows type expansion type cylinder surrounding said shaft and hermetically joining said sump tank to said motor housing, an outlet duct connected to said sump tank above the predetermined upper lever of the liquid being pumped and being in gas communication with said inlet duct; a supply of inert gas connected to said intake duct, and pressure means associated with said gas supply for maintaining said gas at said intake duct at a substantially constant positive pressure with respect to said outlet whereby a continuous flow of gas is provided through said bellows type expansion cylinder during operation of said pump in a path directed from said motor toward said pump to overcome upward vapor diffusion along said shaft from liquid in said sump tank.

References Cited in the file of this patent

UNITED STATES PATENTS

| | | |
|---|---|---|
| 1,958,065 | Paasche | May 8, 1934 |
| 2,005,587 | Lorig | June 18, 1935 |
| 2,075,895 | Harmon | Apr. 6, 1937 |
| 2,320,208 | Yost | June 1, 1943 |
| 2,468,704 | Pippin | Apr. 26, 1949 |
| 2,682,229 | Luenberger | June 29, 1954 |
| 2,747,901 | Clavell | May 29, 1956 |
| 2,764,943 | Peters | Oct. 2, 1956 |
| 2,796,027 | Brown | June 18, 1957 |